US010458325B2

(12) United States Patent
Gaul et al.

(10) Patent No.: US 10,458,325 B2
(45) Date of Patent: *Oct. 29, 2019

(54) ROTARY INTERNAL COMBUSTION ENGINE WITH PILOT SUBCHAMBER AND IGNITION ELEMENT

(71) Applicant: PRATT & WHITNEY CANADA CORP., Longueuil (CA)

(72) Inventors: Michael Gaul, Montreal (CA); Andre Julien, Ste-Julie (CA); Bruno Villeneuve, Boucherville (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,568

(22) Filed: Mar. 20, 2018

(65) Prior Publication Data

US 2018/0209332 A1 Jul. 26, 2018

Related U.S. Application Data

(63) Continuation of application No. 15/143,974, filed on May 2, 2016, now Pat. No. 10,006,359, which is a
(Continued)

(51) Int. Cl.
*F02B 53/12* (2006.01)
*F02B 19/10* (2006.01)
(Continued)

(52) U.S. Cl.
CPC ............. *F02B 53/12* (2013.01); *F01C 1/22* (2013.01); *F02B 19/108* (2013.01); *F02B 19/12* (2013.01);
(Continued)

(58) Field of Classification Search
CPC .......... F02B 53/12; F02B 53/02; F02B 19/12; F02B 53/10; F02B 19/108;
(Continued)

(56) References Cited

U.S. PATENT DOCUMENTS 1,539,133 A 8/1920 Markle et al.
2,932,289 A 10/1958 Witzky
(Continued)

FOREIGN PATENT DOCUMENTS

DE 1926474 1/1970
EP 2551448 1/2013
(Continued)

*Primary Examiner* — J. Todd Newton
(74) *Attorney, Agent, or Firm* — Norton Rose Fulbright Canada L.L.P.

(57) ABSTRACT

A rotary engine includes an insert having a pilot subchamber defined therein and communicating with the internal cavity of the engine. A pilot fuel injector has a tip in communication with the pilot subchamber. An ignition element extends into an element cavity defined through the insert adjacent the pilot subchamber. The element cavity is in communication with the pilot subchamber through a communication opening defined in the insert between the element cavity and the pilot subchamber. The communication opening is smaller than a portion of the ignition element adjacent the communication opening such as to prevent the portion of the ignition element from completely passing through the communication opening upon breaking off of the portion of the ignition element from a remainder of the ignition element. An outer body for a rotary engine and a method of combusting fuel in a rotary engine are also provided.

15 Claims, 6 Drawing Sheets

Related U.S. Application Data continuation of application No. 13/910,807, filed on Jun. 5, 2013, now Pat. No. 9,334,794.

(51) Int. Cl.
| | |
|---|---|
| *F02B 55/08* | (2006.01) |
| *F01C 1/22* | (2006.01) |
| *F02B 53/10* | (2006.01) |
| *F02B 19/12* | (2006.01) |
| *F02B 53/02* | (2006.01) |
| *F02M 53/02* | (2006.01) |
| *F02P 19/02* | (2006.01) |
| *F02B 55/14* | (2006.01) |
| *F02B 53/00* | (2006.01) |

(52) U.S. Cl.
CPC .............. *F02B 53/02* (2013.01); *F02B 53/10* (2013.01); *F02B 55/08* (2013.01); *F02M 53/02* (2013.01); *F02P 19/02* (2013.01); *F02B 55/14* (2013.01); *F02B 2053/005* (2013.01); *Y02T 10/125* (2013.01); *Y02T 10/17* (2013.01)

(58) Field of Classification Search
CPC ..... F02B 2053/005; F02B 55/14; F02P 19/02; F02M 53/02; F01C 1/22; Y02T 10/17; Y02T 10/125
USPC ....... 123/207, 200, 205, 208, 209, 210, 212, 123/214, 218, 231, 243, 273, 275, 284, 123/445; 60/39.6, 36.62, 39.63, 39.64
See application file for complete search history.

(56) References Cited

U.S. PATENT DOCUMENTS

| | | |
|---|---|---|
| 2,935,054 A | 5/1960 | Franke et al. |
| 3,058,452 A | 10/1962 | Espenschied |
| 3,102,521 A | 9/1963 | Slemmons |
| 3,140,697 A | 7/1964 | Péras |
| 3,890,940 A | 6/1975 | List |
| 3,894,518 A | 7/1975 | Gavrun et al. |
| 3,954,088 A | 5/1976 | Scott |
| 3,957,021 A | 5/1976 | Loyd, Jr. |
| 3,958,538 A | 5/1976 | Hoshino |
| 3,960,115 A | 6/1976 | Lamping et al. |
| 3,976,036 A | 8/1976 | Muroki et al. |
| 3,977,367 A | 8/1976 | Roberts |
| 3,987,759 A | 10/1976 | Roberts et al. |
| 3,987,763 A | 10/1976 | Klomp |
| 4,077,368 A | 3/1978 | Abthoff et al. |
| 4,091,789 A | 5/1978 | Jones |
| 4,098,232 A | 7/1978 | Gleiter |
| 4,108,133 A | 8/1978 | Konishi et al. |
| 4,108,136 A | 8/1978 | Hideg et al. |
| 4,300,497 A | 11/1981 | Webber |
| 5,163,385 A | 11/1992 | McMillian |
| 5,769,050 A | 6/1998 | Ito et al. |
| 5,979,395 A | 11/1999 | Mallen et al. |
| 6,125,813 A | 10/2000 | Louthan et al. |
| 6,162,034 A | 12/2000 | Mallen |
| 6,244,240 B1 | 6/2001 | Mallen |
| 6,276,334 B1 | 8/2001 | Flynn et al. |
| 6,321,713 B1 | 11/2001 | Mallen |
| 6,435,851 B2 | 8/2002 | Mallen |
| 8,181,617 B2 | 5/2012 | Kuhnert et al. |
| 9,334,794 B2 * | 5/2016 | Gaul .................... F01C 1/22 |
| 9,638,093 B2 | 5/2017 | Blank |
| 9,664,047 B2 | 5/2017 | McDaniel et al. |
| 10,006,359 B2 * | 6/2018 | Gaul .................... F01C 1/22 |
| 2013/0025567 A1 | 1/2013 | Thomassin et al. |

FOREIGN PATENT DOCUMENTS

| | | |
|---|---|---|
| GB | 780023 | 7/1957 |
| WO | 98/57037 | 12/1998 |
| WO | 2011/092365 | 8/2011 |

* cited by examiner

FIG-2a

ROTARY INTERNAL COMBUSTION ENGINE WITH PILOT SUBCHAMBER AND IGNITION ELEMENT

CROSS-REFERENCE TO RELATED APPLICATIONS

This application is a continuation of U.S. application Ser. No. 15/143,974 filed May 2, 2016, which is a continuation of U.S. application Ser. No. 13/910,807 filed Jun. 5, 2013, the entire contents of both of which are incorporated by reference herein.

TECHNICAL FIELD

The application relates generally to rotary internal combustion engines and, more particularly, to fuel ignition in such engines.

BACKGROUND OF THE ART

Rotary engines use the rotation of a piston to convert pressure into a rotating motion, instead of using reciprocating pistons. In these engines, the rotor typically includes a number of seals that remain in contact with wall(s) of the rotor cavity of the engine throughout the rotational motion of the rotor to create a plurality of rotating chambers when the rotor rotates.

Rotary engines come in many forms. One well-known type, the Wankel engine, has a generally triangular rotor received in a two-lobed epitrochoid cavity. Other non-Wankel rotary engines types exist as well.

Some rotary engines include a pilot subchamber for pilot ignition, in which the tip portion of an ignition element such as a glow plug is received. However, known arrangements are not optimized and room for improvement exists.

SUMMARY

In one aspect, there is provided a rotary engine comprising: an outer body having a plurality of interconnected walls defining an internal cavity; a rotor body rotatable within the internal cavity in sealing engagement with the walls of the outer body and defining at least one chamber of variable volume in the internal cavity around the rotor body; an insert in one of the walls of the outer body, the insert having a pilot subchamber defined therein communicating with the internal cavity; a main fuel injector having a tip in communication with the internal cavity at a location spaced apart from the insert; a pilot fuel injector having a tip in communication with the subchamber; and an ignition element extending into an element cavity defined through the insert adjacent the subchamber, a portion of the element being in communication with the subchamber through a communication opening defined in the insert between the element cavity and the subchamber, the communication opening having a cross-section smaller than a corresponding cross-section of the portion of the element.

In another aspect, there is provided an outer body for a rotary engine comprising: two axially spaced apart end walls; a peripheral wall extending between the end walls and defining an internal cavity therewith for receiving a rotor therein; an insert in the peripheral wall of the outer body, the insert having a subchamber defined therein in communication with the cavity; the outer body further having: a pilot injector hole defined therethrough in communication with the subchamber and sized to receive a pilot fuel injector, and a main fuel injector hole defined therethrough in communication with the cavity, spaced apart from the insert and sized to receive a main fuel injector; and an ignition element received in the insert in communication with the subchamber through an opening smaller than corresponding dimensions of a portion of the element extending adjacent the opening such as to prevent the portion from completely passing through the opening.

In another aspect, there is provided a method of combusting fuel in a rotary engine having a rotor rotating in a cavity, the method comprising: injecting a minor portion of the fuel into a subchamber defined in an insert located in a peripheral wall of the engine; activating a portion of an ignition element received in the insert adjacent the subchamber; exposing the portion of the element to the fuel in the subchamber through a communication opening defined through the insert, the communication opening being sized to prevent the portion of the element from completely passing therethrough; igniting the fuel in the subchamber with the portion of the element; circulating the ignited fuel from the subchamber to the cavity; and injecting a remainder of the fuel into the cavity independently of and spaced apart from the subchamber.

In another aspect, there is provided a rotary engine comprising: an outer body having walls surrounding an internal cavity; a rotor body rotatable within the internal cavity and cooperating with the walls of the outer body to define at least one chamber of variable volume; an insert in one of the walls of the outer body, the insert having a pilot subchamber defined therein communicating with the internal cavity and including a subchamber wall surrounding the pilot subchamber; a main fuel injector in communication with the internal cavity at a location spaced apart from the insert; a pilot fuel injector in communication with the pilot subchamber; and a heating element extending within the subchamber wall completely outside of the pilot subchamber, the heating element being in heat transfer communication with the subchamber wall.

In another aspect, there is provided an outer body for a Wankel engine comprising: interconnected walls surrounding an internal cavity having an epichotroid shape, the internal cavity configured to sealingly engage a rotor receivable therein; an insert in one of the interconnected walls, the insert having a pilot subchamber defined therein in communication with the cavity, the insert having a pilot injector hole defined therein in communication with the pilot subchamber and sized to receive a tip of a pilot fuel injector; and a heating element extending within the insert completely outside of the pilot subchamber, the heating element being in heat transfer communication with a wall of the pilot subchamber.

In another aspect, there is provided a method of combusting fuel in a rotary engine having a rotor rotating in a cavity, the method comprising: injecting a minor portion of the fuel into a pilot subchamber defined in an insert located in a wall of the engine; heating a portion of the insert defining a wall of the pilot subchamber by activating a heating element received in the insert adjacent the pilot subchamber, the heating element extending in the insert without extending in the pilot subchamber; igniting the fuel in the pilot subchamber with the heated wall of the pilot subchamber; circulating the ignited fuel from the pilot subchamber to the cavity; and injecting a remainder of the fuel into the cavity independently of and spaced apart from the pilot subchamber.

In another aspect, there is provided a rotary engine comprising: an outer body having walls defining an internal cavity; a rotor rotatable within the internal cavity in sealing engagement with the walls of the outer body; an insert having a pilot subchamber defined therein, the pilot subchamber communicating with the internal cavity; a pilot fuel injector having a tip in communication with the pilot subchamber; and an ignition element extending into an element cavity defined through the insert adjacent the pilot subchamber, the element cavity in communication with the pilot subchamber through a communication opening defined in the insert between the element cavity and the pilot subchamber, the communication opening being smaller than a portion of the ignition element adjacent the communication opening such as to prevent the portion of the ignition element from completely passing through the communication opening upon breaking off of the portion of the ignition element from a remainder of the ignition element.

In another aspect, there is provided an outer body for a rotary engine comprising: interconnected walls cooperating to define an internal cavity for receiving a rotor; an insert having a subchamber defined therein in communication with the internal cavity, the insert configured to define a fluid communication between a tip of a pilot fuel injector and the subchamber; and an ignition element received in the insert, the ignition element in communication with the subchamber through an opening smaller than corresponding dimensions of a portion of the ignition element extending in the insert adjacent the opening sized such as to prevent a portion of the ignition element adjacent the opening from completely passing through the opening upon breaking off of the portion of the ignition element from a remainder of the ignition element.

In a further aspect, there is provided a method of combusting fuel in a rotary engine having a rotor rotating in a cavity, the method comprising: injecting a minor portion of the fuel into a subchamber defined in an insert of the engine; activating a portion of an ignition element received in the insert, the portion of the ignition element located adjacent a communication opening defined through the insert and communicating with the subchamber, the communication opening being sized to prevent the portion of the ignition element from completely passing therethrough upon breaking off of the portion of the ignition element from a remainder of the ignition element; igniting the minor portion of the fuel in the subchamber by exposing the portion of the ignition element to the minor portion of the fuel through the communication opening; circulating the ignited minor portion of the fuel from the subchamber to the cavity; and injecting a remaining portion of the fuel into the cavity.

DESCRIPTION OF THE DRAWINGS

Reference is now made to the accompanying figures in which:

FIG. 2a is an enlarged view of the insert of FIG. 1;

FIG. 2b is a schematic cross-sectional view taken along line 2b-2b in FIG. 2a;

FIG. 3a is a schematic cross-sectional view of a pilot subchamber insert in accordance with another particular embodiment;

FIG. 3b is a schematic cross-sectional view taken along line 3b-3b in FIG. 3a;

FIG. 4b is a schematic cross-sectional view taken along line 4b-4b in FIG. 4a;

DETAILED DESCRIPTION

Figure 1:
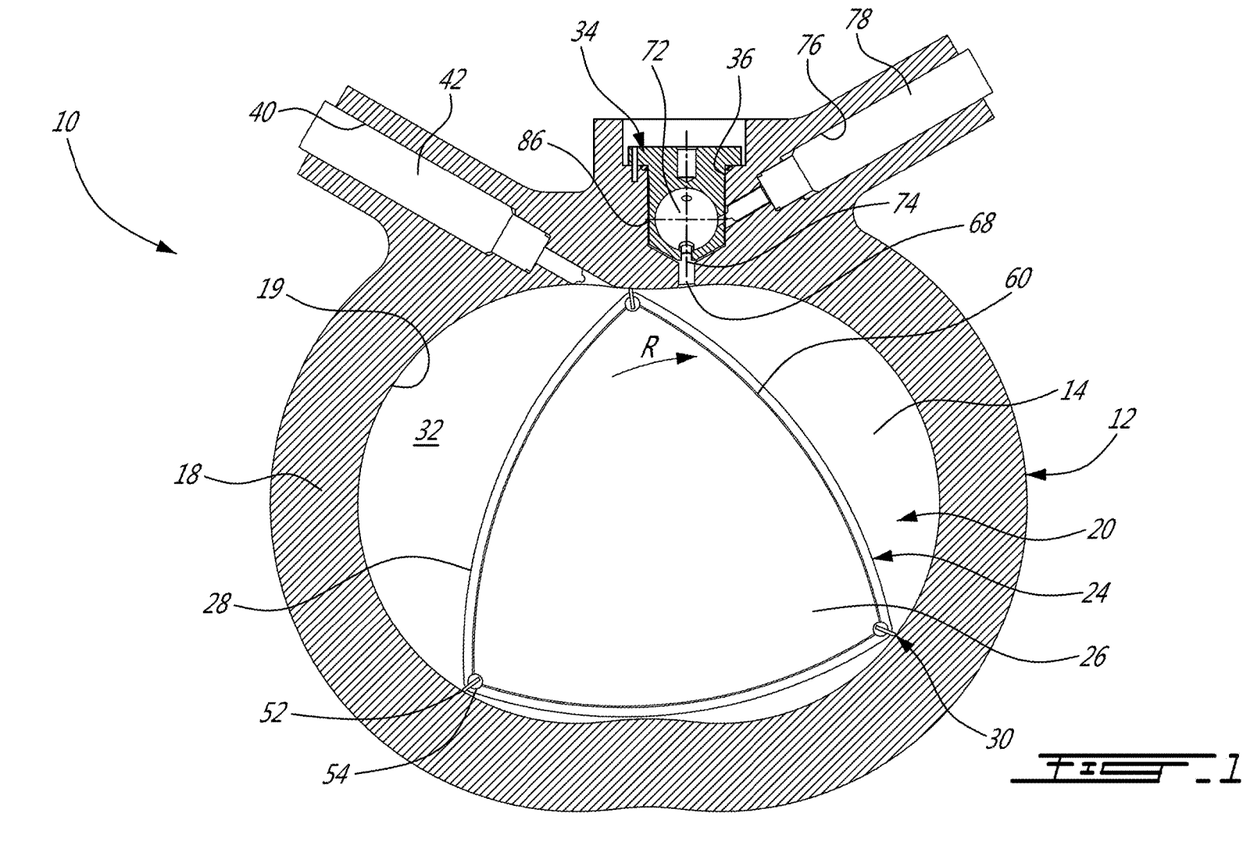
FIG. 1 is a schematic cross-sectional view of a rotary internal combustion engine having a pilot subchamber insert in accordance with a particular embodiment.

Referring to FIG. 1, a rotary internal combustion engine 10 known as a Wankel engine is schematically and partially shown. In a particular embodiment, the rotary engine 10 is used in a compound cycle engine system such as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein. The compound cycle engine system may be used as a prime mover engine, such as on an aircraft or other vehicle, or in any other suitable application. In any event, in such a system, air is compressed by a compressor before entering the Wankel engine, and the engine drives one or more turbine(s) of the compound engine. In another embodiment, the rotary engine 10 is used without a turbocharger, with air at atmospheric pressure.

The engine 10 comprises an outer body 12 having axially-spaced end walls 14 with a peripheral wall 18 extending therebetween to form a rotor cavity 20. The inner surface 19 of the peripheral wall 18 of the cavity 20 has a profile defining two lobes, which is preferably an epitrochoid.

An inner body or rotor 24 is received within the cavity 20, with the geometrical axis of the rotor 24 being offset from and parallel to the axis of the outer body 12. The rotor 24 has axially spaced end faces 26 adjacent to the outer body end walls 14, and a peripheral face 28 extending therebetween. The peripheral face 28 defines three circumferentially-spaced apex portions 30 and a generally triangular profile with outwardly arched sides. The apex portions 30 are in sealing engagement with the inner surface 19 of the peripheral wall 18 to form three rotating working chambers 32 between the inner rotor 24 and outer body 12. A recess (not shown) is defined in the peripheral face 28 of the rotor 24 between each pair of adjacent apex portions 30, to form part of the corresponding chamber 32.

The working chambers 32 are sealed. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof.

Although not shown in the Figures, the rotor 24 is journaled on an eccentric portion of a shaft and includes a phasing gear co-axial with the rotor axis, which is meshed with a fixed stator phasing gear secured to the outer body co-axially with the shaft. The shaft rotates the rotor 24 and the meshed gears guide the rotor 24 to perform orbital revolutions within the rotor cavity. The shaft rotates three times for each complete rotation of the rotor 24 as it moves around the rotor cavity 20. Oil seals are provided around the phasing gear to prevent leakage flow of lubricating oil radially outwardly thereof between the respective rotor end face 26 and outer body end wall 14.

At least one inlet port (not shown) is defined through one of the end walls 14 or the peripheral wall 18 for admitting air (atmospheric or compressed) into one of the working chambers 32, and at least one exhaust port (not shown) is defined through one of the end walls 14 or the peripheral wall 18 for discharge of the exhaust gases from the working chambers 32. The inlet and exhaust ports are positioned relative to each other and relative to the ignition member and fuel injectors (further described below) such that during each rotation of the rotor 24, each chamber 32 moves around the cavity 20 with a variable volume to undergo the four phases of intake, compression, expansion and exhaust, these phases being similar to the strokes in a reciprocating-type internal combustion engine having a four-stroke cycle.

In a particular embodiment, these ports are arranged such that the rotary engine 10 operates under the principle of the Miller or Atkinson cycle, with its volumetric compression ratio lower than its volumetric expansion ratio. In another embodiment, the ports are arranged such that the volumetric compression and expansion ratios are equal or similar to one another.

Referring to FIGS. 1-2a, the engine 10 shown includes a pilot subchamber 72 defined in the outer body 12, for pilot fuel injection and ignition. The pilot subchamber 72 is provided in an insert 34 received in a corresponding hole 36 defined through the peripheral wall 18 of the outer body 12. The insert 34 is retained to the peripheral wall 18 using any adequate type of connection, shown here as one or more fasteners 38 (see FIG. 2a); other adequate types of connection include, but are not limited to, welding, brazing, retention through a cover overlapping the insert 34 and connected to the peripheral wall 18, etc.

Referring back to FIG. 1, the peripheral wall 18 has a main injector elongated hole 40 defined therethrough, in communication with the rotor cavity 20 and spaced apart from the insert 34. A main fuel injector 42 is received and retained within this corresponding hole 40, with the tip of the main injector 42 communicating with the cavity at a point spaced apart from the insert 34. The main injector 42 is located rearwardly of the insert 34 with respect to the direction R of the rotor rotation and revolution, and is angled to direct fuel forwardly into each of the rotating chambers 32 sequentially with a tip hole pattern designed for an adequate spray.

The peripheral wall 18 also has a pilot injector elongated hole 76 defined therethrough, at an angle with respect to the insert 34 and in communication with the subchamber 72. A pilot fuel injector 78 is received and retained within the corresponding hole 76, with the tip of the pilot injector 78 being in communication with the subchamber 72, for example by terminating in a corresponding opening defined in the insert 34 between the subchamber 72 and the pilot injector hole 76.

The pilot injector 78 and main injector 42 inject fuel, which in a particular embodiment is heavy fuel e.g. diesel, kerosene (jet fuel), equivalent biofuel, etc. into the chambers 32. Alternately, the fuel may be any other adequate type of fuel suitable for injection as described, including non-heavy fuel such as for example gasoline or liquid hydrogen fuel. In a particular embodiment, at least 0.5% and up to 20% of the fuel is injected through the pilot injector 78, and the remainder is injected through the main injector 42. In another particular embodiment, at most 10% of the fuel is injected through the pilot injector 78. In another particular embodiment, at most 5% of the fuel is injected through the pilot injector 78. The main injector 42 injects the fuel such that each rotating chamber 32 when in the combustion phase contains a lean mixture of air and fuel.

Referring to FIG. 2a, in the embodiment shown, the insert body 34 has the entire pilot subchamber 72 defined therein, shown here with a circular cross-section. Other geometries are also possible, including but not limited to cylindrical, conical, frustoconical, ovoid, teardrop-shaped, "light bulb"-shaped, wedge-shaped profiles, etc. The insert 34 includes at least one outlet opening 74 defined therein for communication with the cavity 20. In the embodiment shown, the subchamber 72 has a shape forming a reduced cross-section adjacent the opening(s) 74, such that the opening(s) 74 define a restriction to the flow between the subchamber 72 and the cavity 20. The opening(s) 74 may have various shapes and/or be defined by a pattern of multiple holes.

In the particular embodiment shown, the insert 34 is located in the peripheral wall 18 outwardly offset from the cavity 20 such that a portion 35 of the peripheral wall 18 extends between the insert 34 and the cavity 20. The inner end of the insert 34 is outwardly offset from the inner surface 19 of the peripheral wall 18 defining the cavity 20, i.e. the insert 34 is not directly exposed the cavity 20. The portion 35 of the peripheral wall 18 extending between the insert 34 and the cavity 20 has at least one opening 68 defined therethrough extending from the inner surface 19 to the insert hole 36, and in communication with the outlet opening(s) 74. In one embodiment, and air gap is provided between the inner end of the insert 34 and the adjacent portion of the peripheral wall 18. Cooling channels may be provided in the portion of the peripheral wall 18 which extends between the insert 34 and the cavity 20.

Alternately, the insert may have inner surface which is continuous with the inner surface 19 of the peripheral wall 20 to define the cavity 20, with the outlet opening(s) directly opening to the cavity 20.

The volume of the subchamber 72 is selected to obtain a stoichiometric mixture around ignition within an acceptable delay, with some of the exhaust product from the previous combustion cycle remaining in the subchamber 72. In a particular embodiment, the volume of the subchamber 72 is at least 0.5% and up to 3.5% of the displacement volume, with the displacement volume being defined as the difference between the maximum and minimum volumes of one chamber 32. In another particular embodiment, the volume of the subchamber 72 corresponds to from about 0.625% to about 1.25% of the displacement volume.

The volume of the subchamber 72 may also be defined as a portion of the combustion volume, which is the sum of the minimum chamber volume $V_{min}$ (including the recess) and the volume of the subchamber $V_2$ itself. In a particular embodiment the subchamber 72 has a volume corresponding to from 5% to 25% of the combustion volume, i.e. $V_2$=5% to 25% of $(V_2+V_{min})$. In another particular embodiment, the subchamber 72 has a volume corresponding to from 10% to 12% of the combustion volume, i.e. $V_2$=10% to 12% of $(V_2+V_{min})$.

It is understood that the particular engine 10 and insert 34 configurations shown and described are provided as an example only and that other configurations are possible.

Figure 2B:
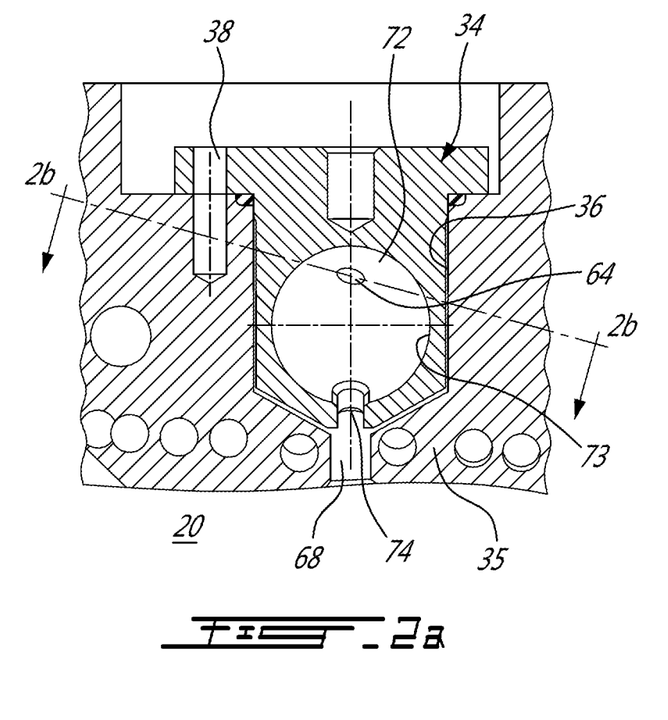
Figure 2C:
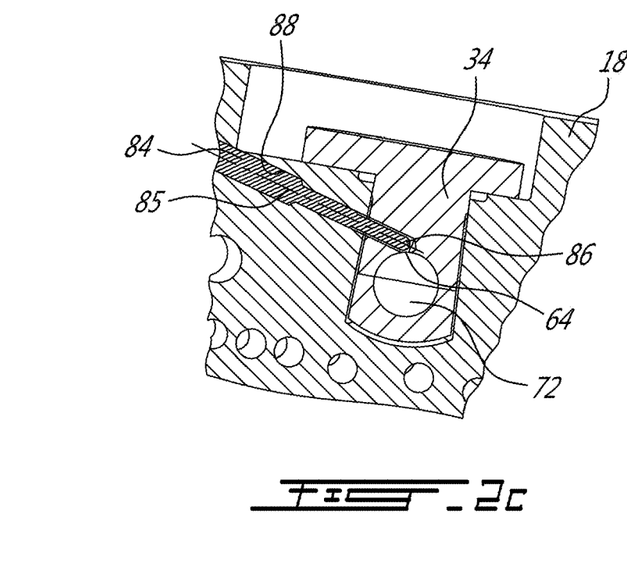
FIG. 2c is a cross-sectional view taken along line 2c-2c in FIG. 2b.

Referring to FIGS. 2a, 2b and 2c, ignition is provided by one or more ignition elements 84 (two in the embodiment shown). In a particular embodiment, the ignition element 84 is a heating element. Each element 84 extends into an element cavity 88 (see FIGS. 2b-2c) which is defined through the peripheral wall 18 adjacent the insert 34 and through the insert 34 adjacent the subchamber 72. It can be seen that the central longitudinal axis 85 (FIGS. 2b-2c) of the element cavity 88, and accordingly of the ignition element 84 received therein, extends through the insert 43 without passing through the subchamber 72. The ignition element cavity 88 is in communication with the subchamber 72 through a communication opening 64 defined in the insert 34 between the element cavity 88 and the subchamber 72, and the portion 86 of the element 84 extending in the cavity 88 adjacent the opening 64 is in contact with the subchamber content through this opening 64. In the embodiment shown, the portion 86 of the element 84 includes its tip.

It can be seen that the communication opening 64 has a cross-section which is smaller than the corresponding cross-section of the exposed portion 86. In other words, the communication opening 64 is smaller than the corresponding portion 86 of the element 84 which is adjacent to it, such as to prevent the portion 86 of the element 84 from passing completely therethrough.

It is understood that the opening 64 may have a dimension in one direction which is larger than the corresponding dimension of the exposed portion 86 of the element 84, as long as the overall shape and dimensions of the opening 64 do not allow the portion 86 of the element 84 to completely pass through the opening 64. In a particular embodiment, this allows for the portion 86 of the element 84 to remain outside of the subchamber 72 if it breaks off from the remainder of the element 84.

In a particular embodiment, the element 84 is a heating element also in heat transfer communication with the subchamber wall 73. The subchamber wall 73 may thus be sufficiently heated to act as an ignition element for the fuel of the subchamber 72, in addition to or instead of the direct ignition by the element 84.

In a particular embodiment, the element 84 is a glow plug.

Figures 3A, 3B:
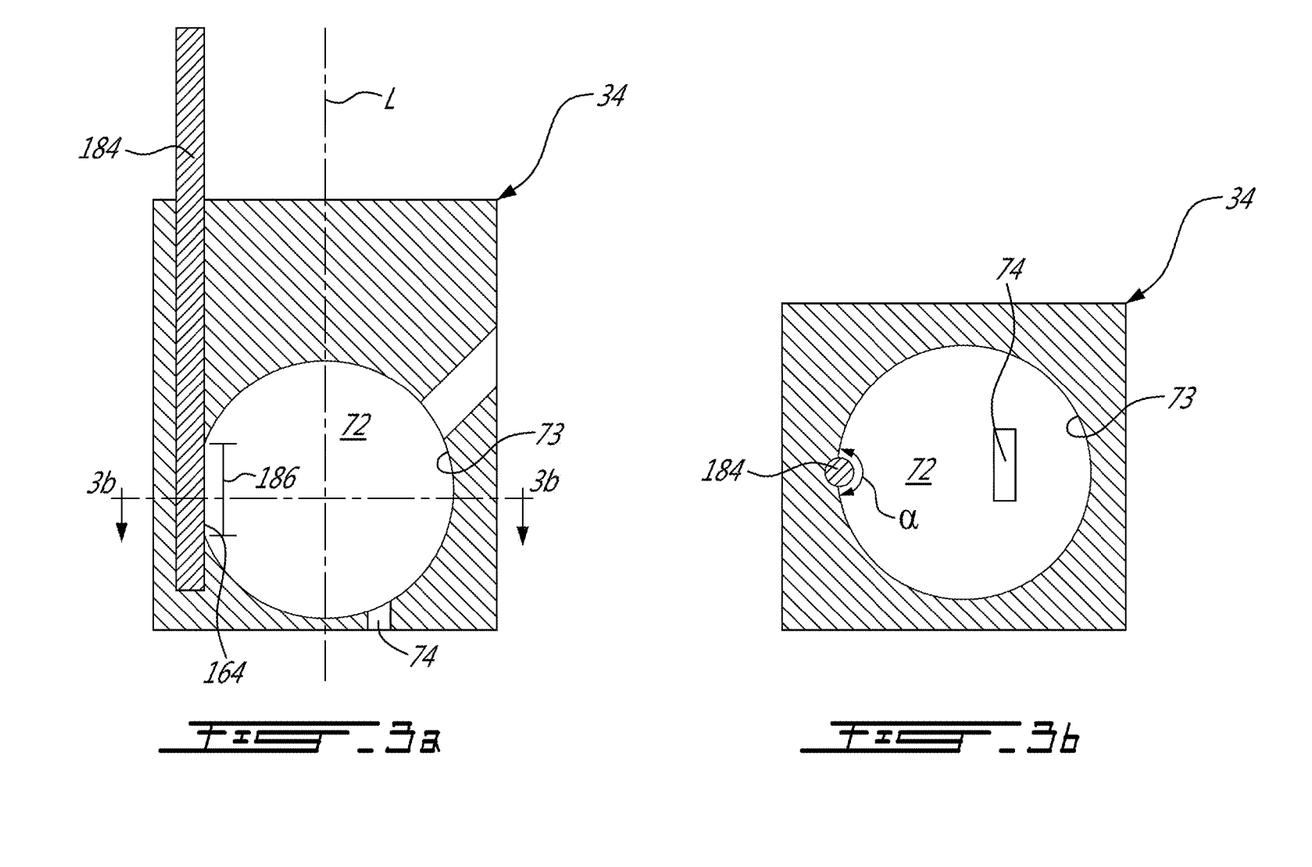

Referring to FIGS. 3a-3b, in another embodiment, the insert 34 includes one or more elongated ignition or heating elements 184 (one in the embodiment shown), which may be for example glow plugs and which extend partially within the subchamber 72. A major portion of the element 184, including its tip, remains outside of the subchamber 72. In the embodiment shown, the element 184 extends parallel or substantially parallel to a longitudinal axis L of the insert 34. It is understood that in another embodiment, the element 184 may have a different orientation.

In the embodiment shown, the exposed portion 186 is cylindrical and a circumferential part thereof extends within the subchamber 72 through the communication opening 164, with the circumferential part extending along an arc defining an angle α of less than 180 degrees, i.e. the central longitudinal axis of the cylindrical portion 186 remains out of the subchamber 72. As such, the exposed portion 186 is prevented from completely passing through the communication opening 164, the dimension of the opening defined transversely to the longitudinal axis L being smaller than the diameter of the exposed portion 186.

The element 184 may also be a heating element in heat transfer communication with the subchamber wall 73 to allow the subchamber wall 73 to be sufficiently heated to act as an ignition element for the fuel of the subchamber 72.

Figure 4A:
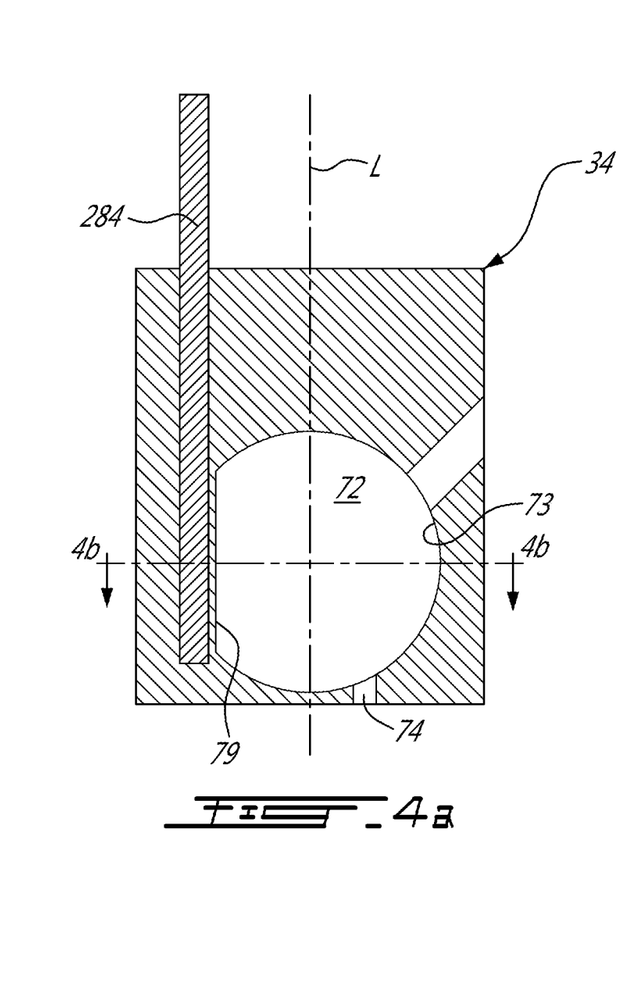
FIG. 4a is a schematic cross-sectional view a pilot subchamber insert in accordance with another particular embodiment.
Figure 4B:
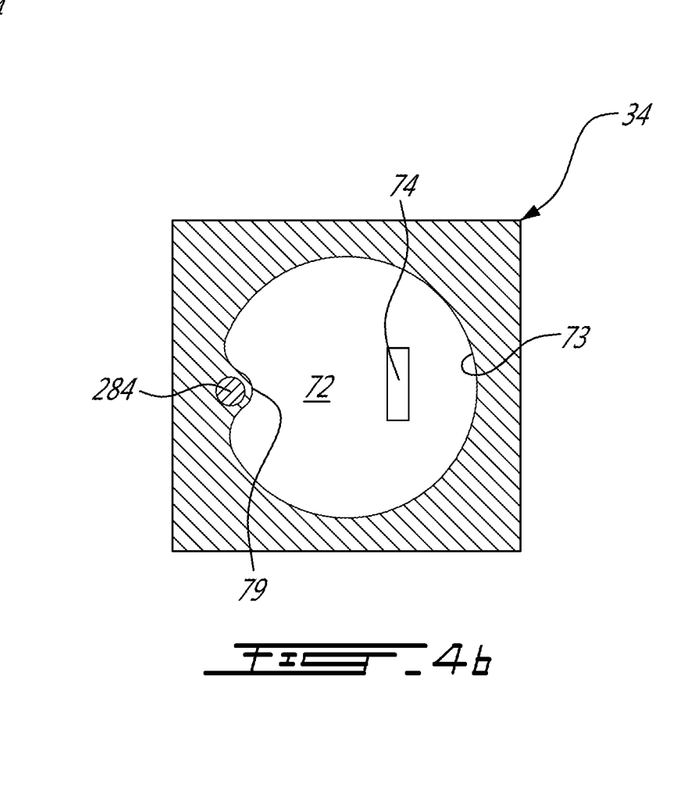

Referring to FIGS. 4a-4b, in another embodiment, the insert 34 includes one or more elongated ignition elements 284 (one in the embodiment shown) which are heating elements, and which may be for example glow plugs. The wall 73 of the subchamber 72 forms an indent 79 protruding within the subchamber 72, and the element 284 extends completely outside of the subchamber 72 against this indent. The wall 73 of the subchamber 72 thus curves around the element 284, allowing the element 284 to be positioned closer to a center of the subchamber 72 while remaining outside thereof. In the embodiment shown, the element 284 extends parallel or substantially parallel to the longitudinal axis L of the insert 34. It is understood that in another embodiment, the element 284 may have a different orientation. The element 284 is in heat transfer communication with the subchamber wall 73 to allow the subchamber wall 73 to be sufficiently heated to act as an ignition element for the fuel of the subchamber 72.

Although not shown, an opening small enough to prevent the adjacent portion of the element 284 from completely passing therethrough may be provided through the indent 79 to form a communication between the element 284 and the subchamber 72.

Figure 5:
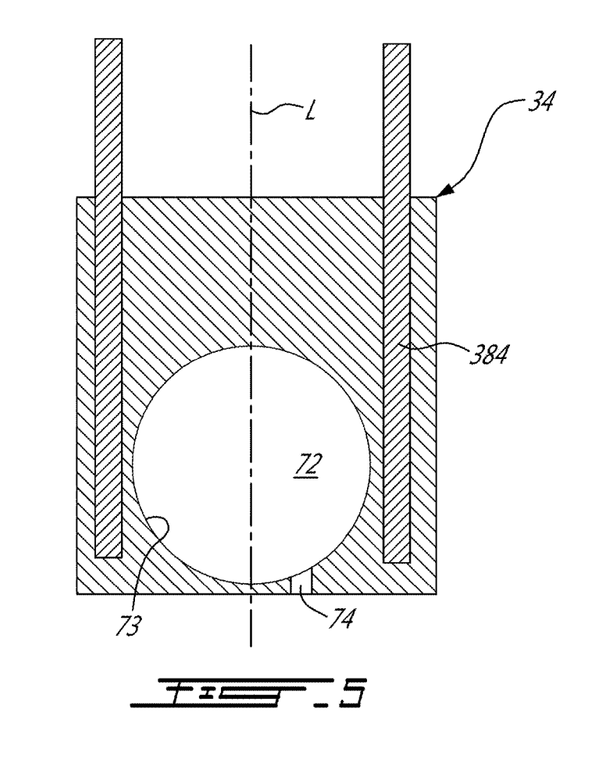
FIG. 5 is a schematic cross-sectional view of a pilot subchamber insert in accordance with a particular embodiment.

Referring to FIG. 5, in another embodiment, the insert 34 includes one or more elongated ignition elements 384 (two in the embodiment shown) in the form of heating elements. In a particular embodiment, each heating element 384 is a glow plug, with a heatable portion thereof being located at its tip. Alternately, each heating element 384 may be heatable along a greater portion of its length, for example the portion thereof in proximity of the subchamber 72. The elements 184 extend through the insert 34 completely outside of the subchamber 72 but in proximity therewith such that heating of the elements 384 heats the wall 73 of the subchamber 72. In the embodiment shown, the elements 384 extend parallel or substantially parallel to the longitudinal axis L of the insert 34. It is understood that in another embodiment, the element 384 may have a different orientation.

Although not shown, an opening small enough to prevent the adjacent portion of the element 384 from completely passing therethrough may be provided through the insert 34 to form a communication between the element 384 and the subchamber 72.

Figure 6:
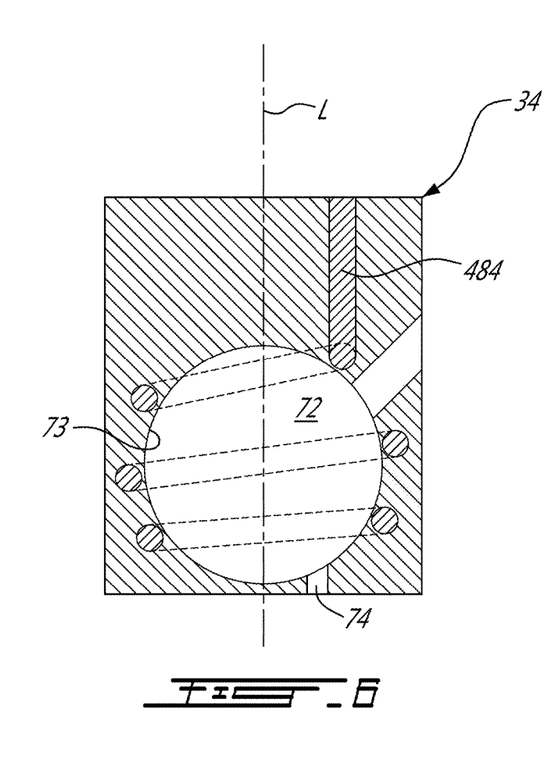
FIG. 6 is a schematic cross-sectional view of a pilot subchamber insert in accordance with another particular embodiment.

Referring to FIG. 6, in another embodiment, the ignition element 484 is provided as a coiled heating element extending around the subchamber 72. In the embodiment shown, the element 484 extends parallel or substantially parallel to the longitudinal axis L of the insert 34, and then curves to circle the subchamber 72 following a helical pattern. It is understood that in another embodiment, the element 484 may have a different orientation. The coiled element 484 may be for example an electrical element, including a heatable wire received in a ceramic outer layer. In the embodiment shown, the coiled element 484 is located completely outside of the subchamber but in proximity therewith such that heating of the element 484 heats the subchamber wall 73.

Although not shown, one or more openings small enough to prevent the adjacent portion of the element 484 from completely passing therethrough may be provided through the insert 34 to form a communication between the element 484 and the subchamber 72. The element 484 may partially protrude into the subchamber 72 through this opening.

In a particular embodiment, each element 84, 184, 284, 384, 484 is located closer to the inner surface of the subchamber wall 73 than to the outer wall surface of the insert 34 to maximise heat transfer to the subchamber 72 and minimize heat transfer to the peripheral wall 18.

In a particular embodiment, the insert 34 is made of a material having a greater high temperature properties and/or lower thermal conductivity than that of the peripheral wall 18, which may be for example made of aluminum. In a particular embodiment, the material of the insert 34 has limited thermal conductivity allowing retention of the heat provided by the element 84, 184, 284, 384, 484 and/or by the fuel ignition, which in a particular embodiment may allow for the element 84, 184, 284, 384, 484 to be activated in a discrete manner instead of in a continuous manner. For example, in one embodiment, the insert 34 is made of a nickel or cobalt based super alloy. Alternate materials can be used, including but not limited to appropriate types of ceramics.

In another embodiment, both the insert 34 and the peripheral wall 18 are made of a same material having sufficient heat resistance and adequate high temperature properties to resist the high temperatures within the subchamber 72. In the embodiments where the subchamber wall 73 is used as an ignition element, the material of the insert 34 has appropriate thermal conductivity to allow for the subchamber wall 73 to act as an ignition element.

In a particular embodiment, the elements 84, 184, 284, 384, 484 which is prevented from having a portion thereof completely penetrating the subchamber 72 may allow for an improved life of the element by reducing exposition thereof to the combustion process within the subchamber, when compared to the use of a glow plug with its tip completely received within the subchamber.

The teachings herein are applicable to many rotary engine types, and not just Wankel engines. In a particular embodiment, the rotary engine may be a single or eccentric type rotary engine in which the rotor rotates about a fixed center of rotation. For example, the rotary engine may be a sliding vane engine, such as described in U.S. Pat. No. 5,524,587 issued Jun. 11, 1996 or in U.S. Pat. No. 5,522,356 issued Jun. 4, 1996, the entire contents of both of which are incorporated by reference herein. In another particular embodiment, the rotary engine may be an oscillatory rotating engine, including two or more rotors rotating at different angular velocities, causing the distance between portions of the rotors to vary and as such the chamber volume to change. In another particular embodiment, the rotary engine may be a planetary rotating engine having a different geometry than that of the Wankel engine, such as for example a planetary engine having a rotor cavity with an epitrochoid profile defining three lobes and a rotor with four apex portions. Examples of such non-Wankel rotary engines are shown in Applicant's U.S. application Ser. No. 13/750,523 filed Jan. 25, 2013, the entire contents of which is incorporated by reference herein. Other rotary engines geometries are also possible.

The above description is meant to be exemplary only, and one skilled in the art will recognize that changes may be made to the embodiments described without departing from the scope of the invention(s) disclosed. For example, the mechanical arrangements of the rotary engines described above are merely examples of many possible configurations which are suitable for use with the present invention(s). Any suitable injector configuration and arrangement may be used. Any suitable ignition element configuration and type may be used. Hence, modifications which fall within the scope of the present invention will be apparent to those skilled in the art, in light of a review of this disclosure, and such modifications are intended to fall within the appended claims.

The invention claimed is:

1. A rotary engine comprising:
an outer body having walls defining an internal cavity;
a rotor rotatable within the internal cavity in sealing engagement with the walls of the outer body;
an insert having a pilot subchamber defined therein, the pilot subchamber communicating with the internal cavity;
a pilot fuel injector having a tip in communication with the pilot subchamber; and
an ignition element extending into an element cavity defined through the insert adjacent the pilot subchamber, the element cavity in communication with the pilot subchamber through a communication opening defined in the insert between the element cavity and the pilot subchamber, the communication opening being smaller than a portion of the ignition element adjacent the communication opening such as to prevent the portion of the ignition element from completely passing through the communication opening upon breaking off of the portion of the ignition element from a remainder of the ignition element.

2. The engine as defined in claim 1, wherein the portion of the ignition element includes a tip thereof partly received through the communication opening.

3. The engine as defined in claim 1, wherein the portion of the ignition element is cylindrical and a circumferential part thereof extends within the pilot subchamber through the communication opening.

4. The engine as defined in claim 1, wherein the insert is made of a material having one or both of greater high temperature properties and lower thermal conductivity than that of the walls of the outer body.

5. The engine as defined in claim 1, wherein the ignition element is a heating element and the portion of the ignition element is heatable.

6. The engine as defined in claim 1, wherein the pilot subchamber has a shape forming a reduced cross-section adjacent the communication with the internal cavity.

7. The rotary engine as defined in claim 1, wherein the ignition element is elongated and extends within the element cavity without protruding into the pilot subchamber.

8. The rotary engine as defined in claim 1, wherein the rotor defines three apex portions and is engaged to an eccentric portion of a shaft to rotate and perform orbital revolutions within the internal cavity, the internal cavity having an epichotroid shape defining two lobes.

9. An outer body for a rotary engine comprising:
interconnected walls cooperating to define an internal cavity for receiving a rotor;
an insert having a subchamber defined therein in communication with the internal cavity, the insert configured to define a fluid communication between a tip of a pilot fuel injector and the subchamber; and
an ignition element received in the insert, the ignition element in communication with the subchamber through an opening smaller than corresponding dimensions of a portion of the ignition element extending in the insert adjacent the opening sized such as to prevent a portion of the ignition element adjacent the opening from completely passing through the opening upon breaking off of the portion of the ignition element from a remainder of the ignition element.

10. The outer body as defined in claim 9, wherein the portion of the ignition element includes a tip thereof partly received through the opening.

11. The outer body as defined in claim 9, wherein the portion of the ignition element is cylindrical and a circumferential part thereof extends within the subchamber through the communication opening.

12. The outer body as defined in claim 9, wherein the insert is made of a material having one or both of greater high temperature properties and lower thermal conductivity than that of the interconnected walls.

13. The outer body as defined in claim 9, wherein the ignition element is a heating element and the portion of the ignition element is heatable.

14. The outer body as defined in claim 9, wherein the subchamber has a shape forming a reduced cross-section adjacent the communication thereof with the internal cavity.

15. The outer body as defined in claim 9, wherein the element is elongated and extends within the insert without protruding into the subchamber.

* * * * *